United States Patent [19]

Sun

[11] Patent Number: 5,572,858
[45] Date of Patent: Nov. 12, 1996

[54] RAKE HEAD MOUNTING STRUCTURE

[76] Inventor: Han-Chin Sun, 53, Lane 45, Tung An Road, Tien Chung Town, Changhua, Taiwan

[21] Appl. No.: 500,689

[22] Filed: Jul. 11, 1995

[51] Int. Cl.$^6$ ........................................... A01D 7/06
[52] U.S. Cl. ...................... 56/400.17; 403/395; 403/398; 403/385
[58] Field of Search ........................... 56/400.17, 400.18, 56/400.01, 104, 400.19; 403/395, 385, 384, 398, 399, 396; 56/400.04, 400.06, 400.11, 400.05, 400.07

[56] References Cited

U.S. PATENT DOCUMENTS

| | | | |
|---|---|---|---|
| 2,766,577 | 10/1956 | Dorman | 56/400.17 |
| 3,394,536 | 7/1968 | Henne | 56/400.18 |
| 3,403,500 | 10/1968 | Wirth | 56/400.17 |
| 5,182,899 | 2/1993 | Sun | 56/400.17 |

*Primary Examiner*—Terry Lee Melius
*Assistant Examiner*—Heather Shackelford
*Attorney, Agent, or Firm*—Beveridge, DeGrandi, Weilacher & Young, LLP

[57] ABSTRACT

A rake head mounting structure for fastening a rake head to a rake handle, including a top retaining strip attached to the top side of the rake head and having a series of through holes, a bottom retaining strip attached to the bottom side of the rake head and having a series of studs respectively fitted into the through holes on the top retaining strip and secured in place by screws, a locating device fastened to the rake head by a clamping plate and having a T-screw secured to a through hole on the rake handle by a wing nut for permitting the front end of the rake handle to be secured to one stud on the bottom retaining strip by a screw.

2 Claims, 4 Drawing Sheets

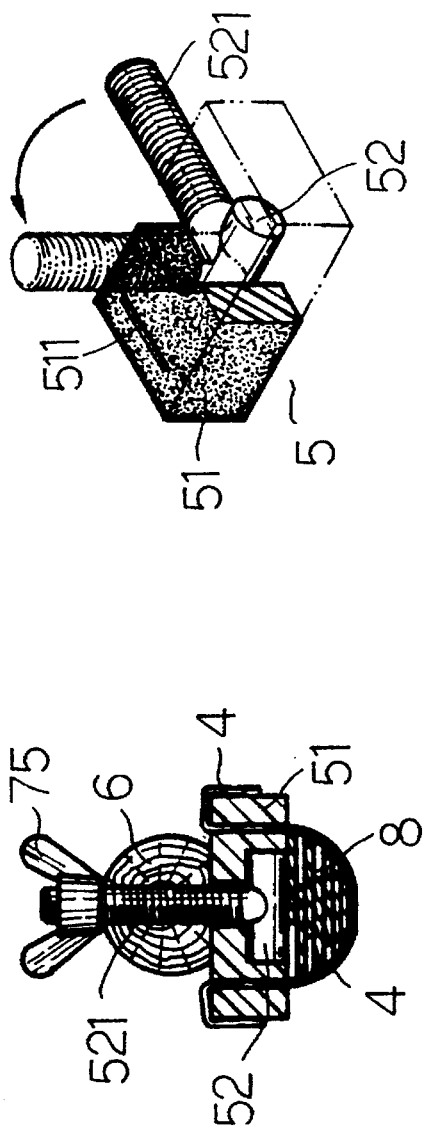
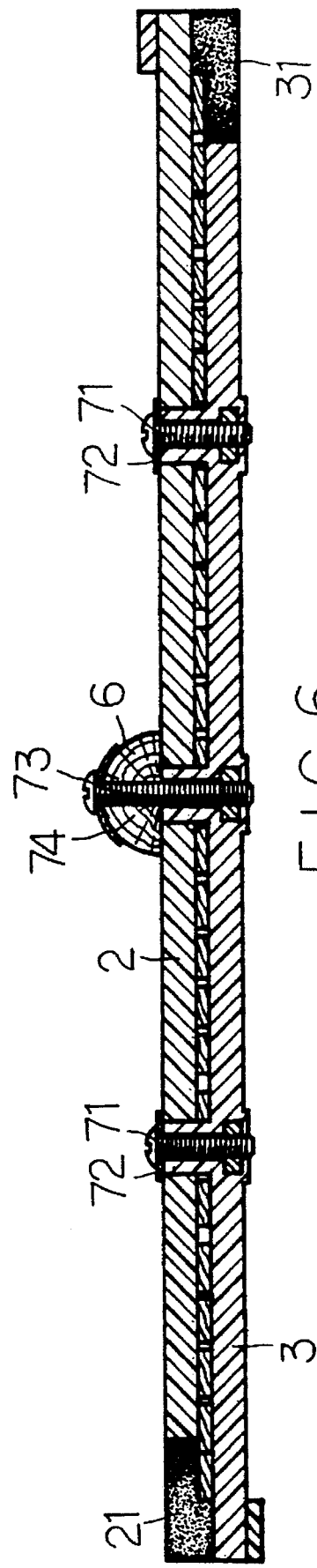

RAKE HEAD MOUNTING STRUCTURE

BACKGROUND OF THE INVENTION

The present invention relates to rakes for collecting tree leaves together, and relates more particularly to a rake head mounting structure which fastens the rake head to the rake handle in the most efficient way.

Rakes are commonly used for raking dead leaves or litter off the grass. FIG. 1 shows a conventional rack which is generally comprised of a rake handle B and a rake head A fastened to the rack handle B. The rake head A is comprised of a plurality of teeth A1 arranged in the form of a sector. Two flat clamping plates C are attached to the rake head A at two opposite sides and tied up by an iron wire F to hold the rake head A in shape. The plain rear ends of the teeth A1 of the rake head A are gathered together and secured to the rake handle B by a holder frame D and a metal binding strip E. The holder frame D has two mounting holes D1. The metal binding strip E is mounted over the rake handle B, having two opposite ends E1 respectively fastened to the mounting holes D1 on the holder frame D to hold the plain rear ends of the teeth A1 and the rake handle B together. The front end of the rake handle B is fixedly secured to the clamping plates C by a screw G. This structure of rake is difficult to assemble. Because this structure of rake is not a detachable design, it needs much storage space during the transportation. Another drawback of this structure of rake is that the clamping plates C tend to injure people when the rake is operated because they protrude over the two opposite lateral sides of the rake head A. Furthermore, the use of the iron wire F to tie up the clamping plates C destructs the sense of beauty of the rake.

SUMMARY OF THE INVENTION

The present invention has been accomplished to provide a rake head mounting structure which eliminates the aforesaid drawbacks. According to one aspect of the present invention, the rake head mounting structure comprises a top retaining strip attached to the top side of the rake head and having a series of through holes, a bottom retaining strip attached to the bottom side of the rake head and having a series of studs respectively fitted into the through holes on the top retaining strip and secured in place by screws, a locating device fastened to the rake head by a clamping plate and having a T-screw secured to a through hole on the rake handle by a wing nut for permitting the front end of the rake handle to be secured to one stud on the bottom retaining strip by a screw. According to another aspect of the present invention, the T-screw of the locating device is pivoted to the plastic base of the locating device, and can be turned between the horizontal position closely attached to the rake head and the vertical position for coupling to the rake handle.

BRIEF DESCRIPTION OF THE DRAWINGS

FIG. 3 is a perspective view in an enlarged scale of the locating device shown in FIG. 2;

FIG. 5 is a cross sectional view taken on a part of FIG. 4, showing the rake handle fastened to the locating device; and FIG. 6 is another cross sectional view taken on a part of FIG. 4, showing the the rake handle fastened to the top retaining strip and the bottom retaining strip.

DETAILED DESCRIPTION OF THE PREFERRED EMBODIMENT

Figure 1:
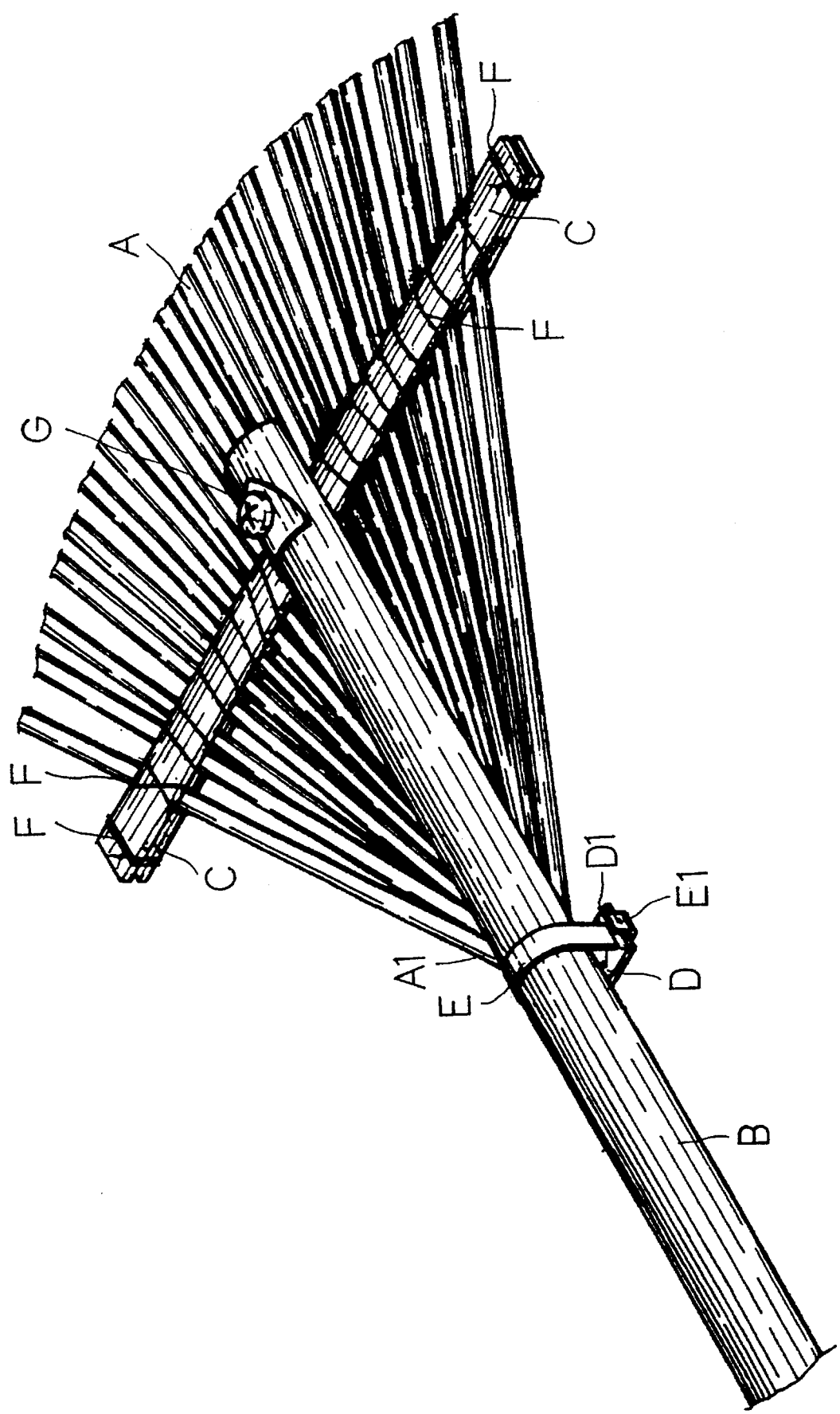
FIG. 1 shows a rake according to the prior art.
Figure 2:
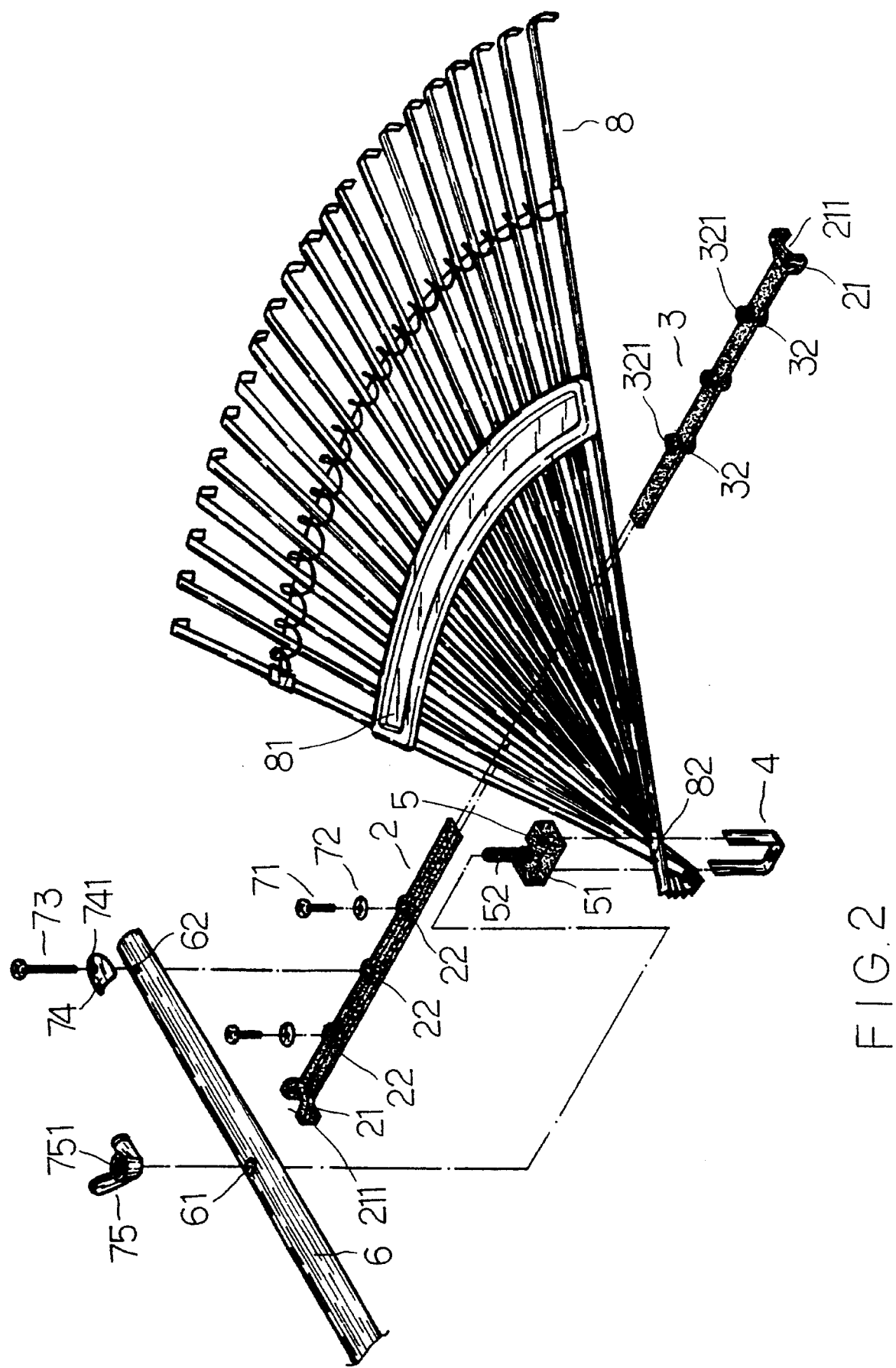
FIG. 2 is an exploded of a rake head mounting structure according to the present invention.

Referring to FIGS. 2 and 3, a rack head mounting structure in accordance with the present invention comprises a top retaining strip 2, a bottom retaining strip 3, and a locating device 5. The top retaining strip 2 is a narrow, elongated strip having a longitudinal series of through holes 22, a coupling head 21 at one end defining a coupling hole 211. The bottom retaining strip 3 is a narrow, elongated strip having a longitudinal series of studs 32, and a coupling head 31 at one end defining a coupling hole 311. Each stud 32 of the bottom retaining strip 3 defines a respective screw hole 321. The locating device 5 comprises a flat plastic base 51, and a T-screw 52 fastened to the plastic base 51 and turned between the horizontal position and the vertical position relative to the plastic base 51. The flat plastic base 51 of the locating device 5 has two retaining holes 511 at two opposite ends.

Figure 4:
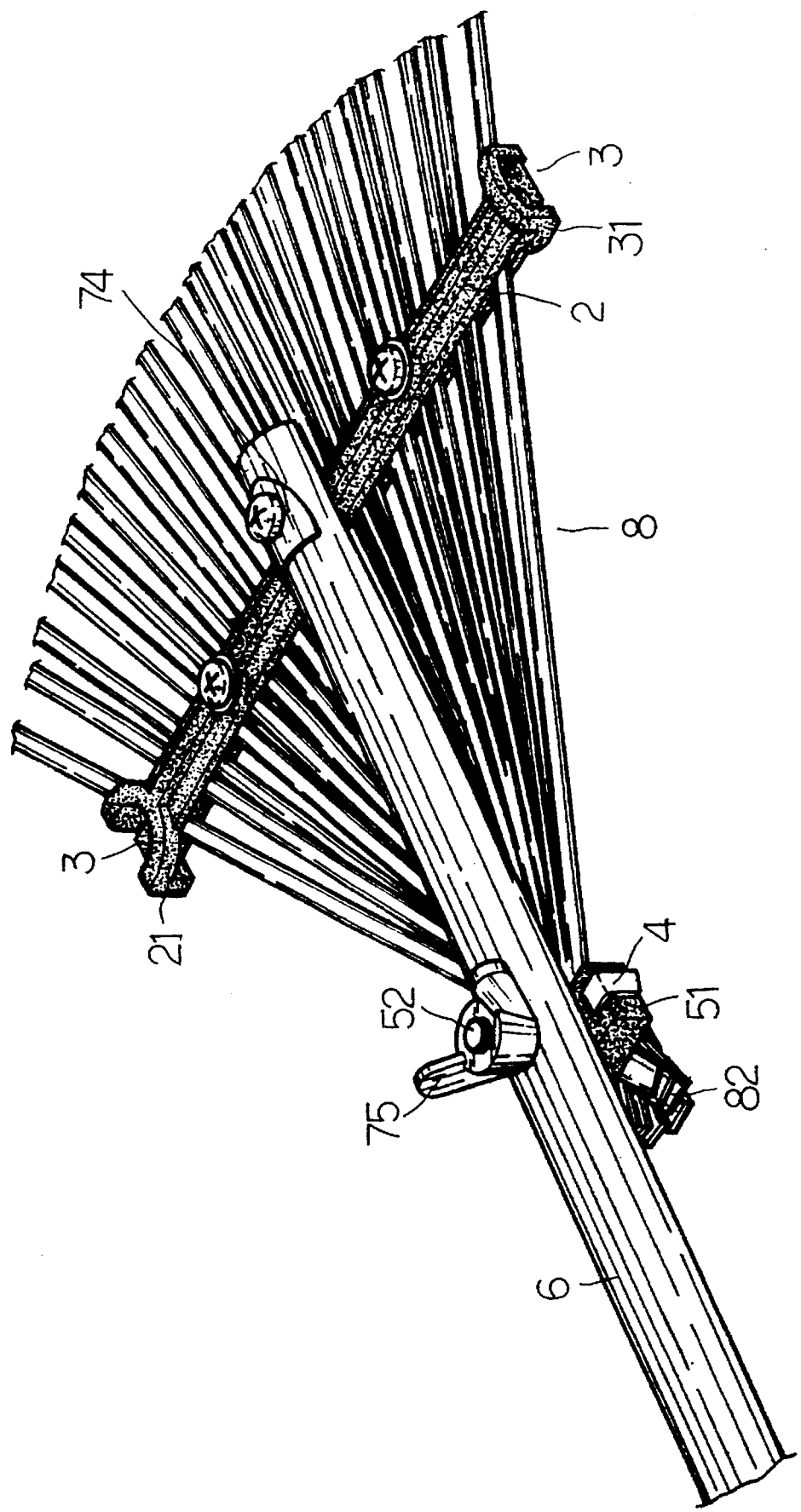
FIG. 4 shows the rake head mounting structure of FIG. 2 assembled.

Referring to FIGS. 4, 5, and 6, and FIGS. 2 and 3 again, the rake head 8 is comprised of a plurality of teeth 82 arranged in the form of a sector and secured in shape by an arched locating plate 81. The top retaining strip 2 and the bottom retaining strip 3 are respectively fastened to the top and bottom sides of the rake head 8 by: fitting the studs 32 of the bottom retaining strip 3 into the through holes 22 on the top retaining strip 2, then fastening the plain rear end of the top retaining strip 2 to the coupling hole 311 on the coupling head 31 of the bottom retaining strip 3 and the plain rear end of the bottom retaining strip 3 to the coupling hole 211 on the coupling head 21 of the top retaining strip 2, and then threading respective screws 71 through respective washers 72 into the screw holes 321 on the studs 32 of the bottom retaining strip 3. The plain rear ends of the teeth 82 are fastened together by the locating device 5 and a clamping strip 4. When the clamping strip 4 is mounted over the plain rear ends of the teeth 82, the two opposite ends of the clamping strip 4 are respectively fastened to the retaining holes 511 on the plastic base 51 of the locating device 5. When the top retaining strip 2, the bottom retaining strip 3, the clamping strip 4, and the locating device 5 are respectively fastened to the rake head 8, the rake handle 6 is fastened to the rake head 8 by: threading a screw 73 through a hole 741 on a gasket 74 and a through hole 62 on the front end of the rake handle 6 into a screw hole 321 on one stud 32 of the bottom retaining strip 3, inserting the screw shank 521 of the T-screw 52 of the locating device 5 through a through hole 61 on the rake handle 6 and threading it into the inner thread 751 on a wing nut 75.

The rake handle 6 can be conveniently detached from the rake head 8 by removing the wing nut 75 from the T-screw 52 of the locating device 5 and the screw 73 from the respective stud 32 of the bottom retaining strip 3. When the rake head 8 is disconnected from the rake handle 6, the T-screw 52 is turned from the vertical position to the horizontal position to prevent from hurting people.

It is to be understood that the drawings are designed for purposes of illustration only, and are not intended as a definition of the limits and scope of the invention disclosed.

I claim:

1. A rake head mounting structure for fastening a rake head to a rake handle, comprising:

a top retaining strip transversely attached to the rake head at one side, said top retaining strip having a longitudinal series of through holes, and a coupling head at one end defining a coupling hole;

a bottom retaining strip transversely attached to the rake head at an opposite side, said bottom retaining strip having a longitudinal series of studs respectively fitted into the through holes on said top retaining strip, each stud defining a respective screw hole for connection to the through holes on said top retaining strip and a through hole on the rake handle by a respective screw; and a locating device secured to the rake head by a clamping plate to hold the rake handle, said locating device comprising a flat plastic base, and a T-screw fastened to said plastic base for securing to a through hole on the rake handle by a wing nut, a cross head of said T-screw being nested within said flat plastic base said flat plastic base having two coupling holes at two opposite ends, said clamping plate having two opposite ends respectively extending through the coupling holes and fastened on said plastic base to secure said locating device to said rake head and fastening means for fastening said rake handle to said top and bottom retaining strip.

2. The rake head mounting structure of claim 1 wherein the T-screw of said locating device comprises said cross head pivoted to said plastic base and a screw shank perpendicularly extended from said cross head.

\* \* \* \* \*